United States Patent [19]
Hiyama et al.

[11] Patent Number: 5,638,636
[45] Date of Patent: Jun. 17, 1997

[54] METHOD AND APPARATUS FOR PLANT CULTURE

[76] Inventors: Kazuo Hiyama, 8184 E. Adams Ave.; Howard K. Hiyama, 8140 E. Adams Ave.; Dean H. Hiyama, 431 E. Curtis Ave., all of Fowler, Calif. 93625

[21] Appl. No.: 271,020

[22] Filed: Jul. 6, 1994

Related U.S. Application Data

[60] Continuation-in-part of Ser. No. 890,848, Jun. 1, 1992, Pat. No. 5,337,514, which is a division of Ser. No. 442,733, Nov. 29, 1989, Pat. No. 5,144,768.

[51] Int. Cl.⁶ .................... A01G 17/06; A01G 17/14
[52] U.S. Cl. ........................................... 47/44; 47/46
[58] Field of Search .................... 47/44 R, 46 R, 47/47 R, 45 R

[56] References Cited

U.S. PATENT DOCUMENTS

| | | |
|---|---|---|
| 542,821 | 7/1895 | Broughton et al. |
| 941,894 | 11/1909 | Stetson . |
| 3,419,998 | 1/1969 | Burton ............... 47/46 |
| 3,469,343 | 9/1969 | Johnson et al. |
| 3,526,993 | 9/1970 | Siebol . |
| 4,023,307 | 5/1977 | Clark et al. |
| 4,270,581 | 6/1981 | Claxton et al. |
| 4,480,402 | 11/1984 | Hiyama ............... 47/1 R |
| 4,625,454 | 12/1986 | Daniell . |
| 4,738,051 | 4/1988 | Dyson . |

FOREIGN PATENT DOCUMENTS

| | | | |
|---|---|---|---|
| 62677 | 5/1975 | Australia ............... 47/46 |
| 1397000 | 5/1988 | U.S.S.R. ............... 47/1 R |
| 1397001 | 5/1988 | U.S.S.R. ............... 47/1 R |
| 1404025 | 6/1988 | U.S.S.R. ............... 47/1 R |

Primary Examiner—Terry Lee Melius
Assistant Examiner—Joanne C. Downs
Attorney, Agent, or Firm—Worrel & Worrel

[57] ABSTRACT

A method of plant culture including the steps of growing plants, which produce elongated flexible portions, in supported relation on a structure; permitting the flexible portions to grow; and moving the flexible portions substantially into separate predetermined positions relative to the plants, based upon predetermined distinguishing characteristics of said flexible portions, for subsequent plant cultural practices. An apparatus for plant culture wherein the plants grow elongated flexible portions each growing season, the apparatus having a frame adapted to be disposed adjacent to at least one of the plants and having a laterally projecting first support portion and an upwardly projecting second support portion; and a support system for moving the flexible portions of the plant discriminately to the first or second portions based upon predetermined distinguishing characteristics.

6 Claims, 6 Drawing Sheets

METHOD AND APPARATUS FOR PLANT CULTURE

This application is a continuation-in-part of application Ser. No. 07/890,848, filed Jun. 1, 1992, now U.S. Pat. No. 5,337,514, which is a division of application Ser. No. 07/442,733, filed Nov. 29, 1989, now U.S. Pat. No. 5,144,768.

BACKGROUND OF THE INVENTION

1. Field of the Invention

The present invention relates to a method and apparatus for plant culture and, more particularly, to such a method and apparatus which are adapted to training the growth of plants in such a fashion as to facilitate the maintenance and productivity thereof by segregating the areas of growth, all in a manner which minimizes the amount of manual labor required to accomplish the foregoing while concomitantly making possible substantially the full automation of such care.

2. Description of the Prior Art

Operations associated with the raising of field crops are dependent upon a multiplicity of factors inherent in the nature of the crop, the growth patterns of the plants, the susceptibility of the plants to parasites and disease, and, more generally, the horticultural practices required in producing the desired results. It has long been known, for example, that the natural growth patterns of the plants may interfere with the performance of some or all of these operations. The training of plants in an effort to minimize or overcome these difficulties is a necessity in modern farming operations.

For example, the successful commercial production of grapes and raisins has long been dependent upon the training of the grapevines on trellis structures to support the grapevines not only for harvesting of the crop therefrom, but also for those horticultural practices required in a successful commercial operation. Left without support, grapevines of all varieties would trail on the ground in such a fashion as to make commercial production completely impossible. Therefore, grapevines are typically grown in rows supported on trellis structures which retain the trunks in upright attitudes so that the crop is, in large part, retained out of ground engagement; so that the canes can be pruned after harvest to prepare the vines for the next growing season; so that the grapevines can be sprayed with insecticide and fertilized as necessary; and so that the grapevines can otherwise be cared for in a manner consistent with the current state of technology.

Notwithstanding the foregoing, farming is still plagued by chronic difficulties incident to these considerations. The increase in the cost of manual labor has caused commercial farming operations to rely more heavily on mechanization. However, many of the foregoing considerations have prevented full mechanization as a means of maintaining the cost of such commercial operations within manageable proportions. Thus, for example, in the case of the commercial production of grapes and raisins, the natural growth patterns of the grapevines are in many cases directly in conflict with those procedures which must be performed in any such commercial operations. Thus, it is known that the canes of the grapevine which produce the crop do so substantially only in the second season of growth. Thus, the canes grow in a first season and those same canes produce the crop in the second season. Conversely, once the fruiting canes have produced a crop, they are no longer as productive and proper horticultural practice calls for those canes, once the crop has been harvested, to be pruned from the grapevine to make room for the growth of new or renewal canes. Unfortunately, the canes naturally grow in a haphazard, random manner which makes it exceedingly difficult to distinguish a first year's growth from a second year's growth. Accordingly, a chronic problem resides in the fact that unskilled laborers frequently prune canes which should be left for the next season's production and mistakenly avoid pruning canes which should be removed to make way for new cane growth in the subsequent season. This not only reduces production in the following years, but is also exceedingly expensive.

Similarly, the random growth pattern of grapevines, even when supported on conventional trellis structures, results in the canes, foliage and crop being so intermixed as to interfere with such operations as harvesting, spraying, pruning, and the like. Similarly, the foliage and canes typically enclose the crop in such a manner that moisture produced by inclement weather is largely entrapped, thereby damaging the crop. Even during clear weather, the desired direct exposure of the crop to sunlight is reduced by the foliage of the grapevines.

Still another example can be found in the vine drying of grapes to form raisins. It has been known to dry grapes on the vine to form raisins in order to avoid the more common process of laying the grapes on trays on the ground for drying. One conventional method, for example, for vine drying of grapes to form raisins calls for the grapes to be sprayed with a substance, such as methyl oleate, to remove the protective coating from the grapes and to sever the canes at a particular time to enhance the dehydration process. In any case, due to the entanglement of the fruiting canes with the renewal canes, it is extremely difficult for field workers to distinguish between the canes. Furthermore, the encapsulating foliage interferes with spraying of the grapes and exposure to sunlight. Accordingly, such conventional vine drying methods have proved less than satisfactory.

Therefore, it has long been known that it would be desirable to have a method and apparatus for plant culture which is capable of training plants in such a fashion as to be fully compatible with the horticultural practices required; which substantially increases the efficiency with which commercial farming operations can operate; which makes possible substantially the full automation of such farming operations; which enhances exposure of the crop produced thereby to sunlight fully to receive the beneficial effects thereof; which requires minimal manual labor throughout the year, both during the dormant and growing seasons, while achieving the optimum horticultural benefits; which has particular utility in the commercial production of grapes and raisins; and which is otherwise fully dependable in achieving the most economic and productive farming operations.

SUMMARY OF THE INVENTION

Therefore, it is an object of the present invention to provide an improved method and apparatus for plant culture.

Another object is to provide such a method and apparatus which are fully compatible with all of the horticultural practices required of a successful commercial farming operation and which, in addition, so control the growth of the plants trained thereby to position the portions thereof for the most efficient and effective performance of each step in the process.

Another object is to provide such a method and apparatus which have particular utility in the commercial production of grapes and raisins.

Another object is to provide such a method and apparatus which are capable of segregating the various portions of the plants into growth zones for the subsequent performance of the various horticultural practices required.

Another object is to provide such a method and apparatus which reduce to an absolute minimum the manual labor required in such a commercial farming operation while so arranging the plants as to make possible a substantially fully automated farming operation while achieving the optimum horticultural benefits thereof.

Another object is to provide such a method and apparatus which are fully compatible with present commercial farming operations permitting them to be introduced to an existing farming operation without a radical change in existing procedures.

Another object is to provide such a method and apparatus which, when applied to the farming of grapevines, permit the first year, or renewal canes, to be segregated from the second year, or fruiting canes, thereby permitting the fruiting canes to be pruned from the grapevines after harvest without in any way risking damage to the renewal canes.

Another object is to provide such a method and apparatus which achieve all of the operational benefits thereof with minimal effort on the part of personnel assigned thereto and with little training.

Further objects and advantages are to provide improved elements and arrangements thereof in an apparatus for the purposes described which is dependable, economical, durable and fully effective in accomplishing its intended purposes.

These and other objects and advantages are achieved, in the preferred embodiment of the method of the present invention, by providing for the steps of growing plants, which produce elongated, flexible portions, in supported relation on a structure; permitting the flexible portions to grow; and moving the flexible portions substantially into predetermined positions relative to the plants on a seasonally discriminate basis for subsequent plant cultural practices.

DESCRIPTION OF THE PREFERRED EMBODIMENT

Figure 1:
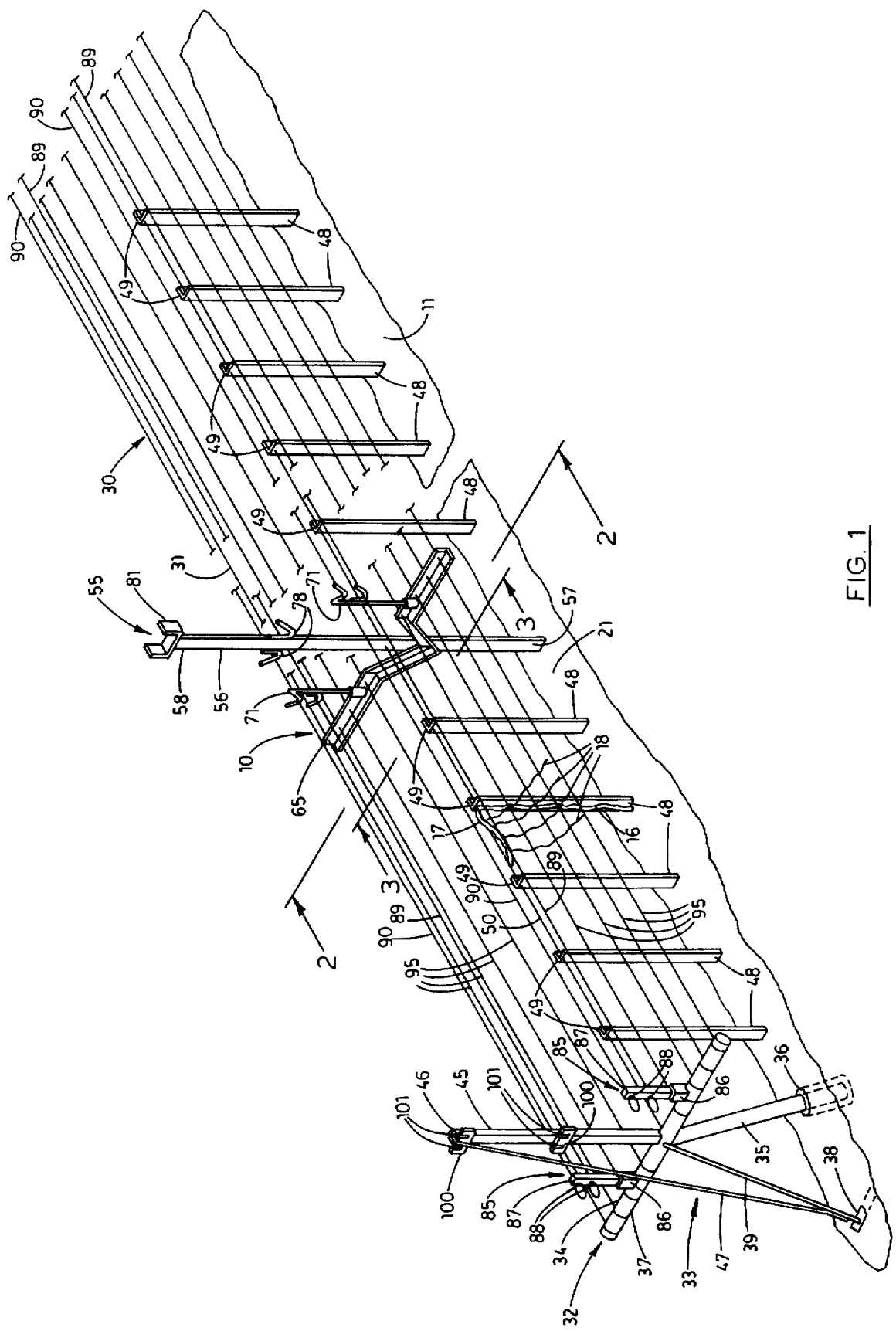
FIG. 1 is a fragmentary, perspective view of the apparatus of the present invention shown in a typical operative environment deployed for the practice of the method of the present invention and showing a single grapevine supported therein for illustrative convenience.
Figure 2:
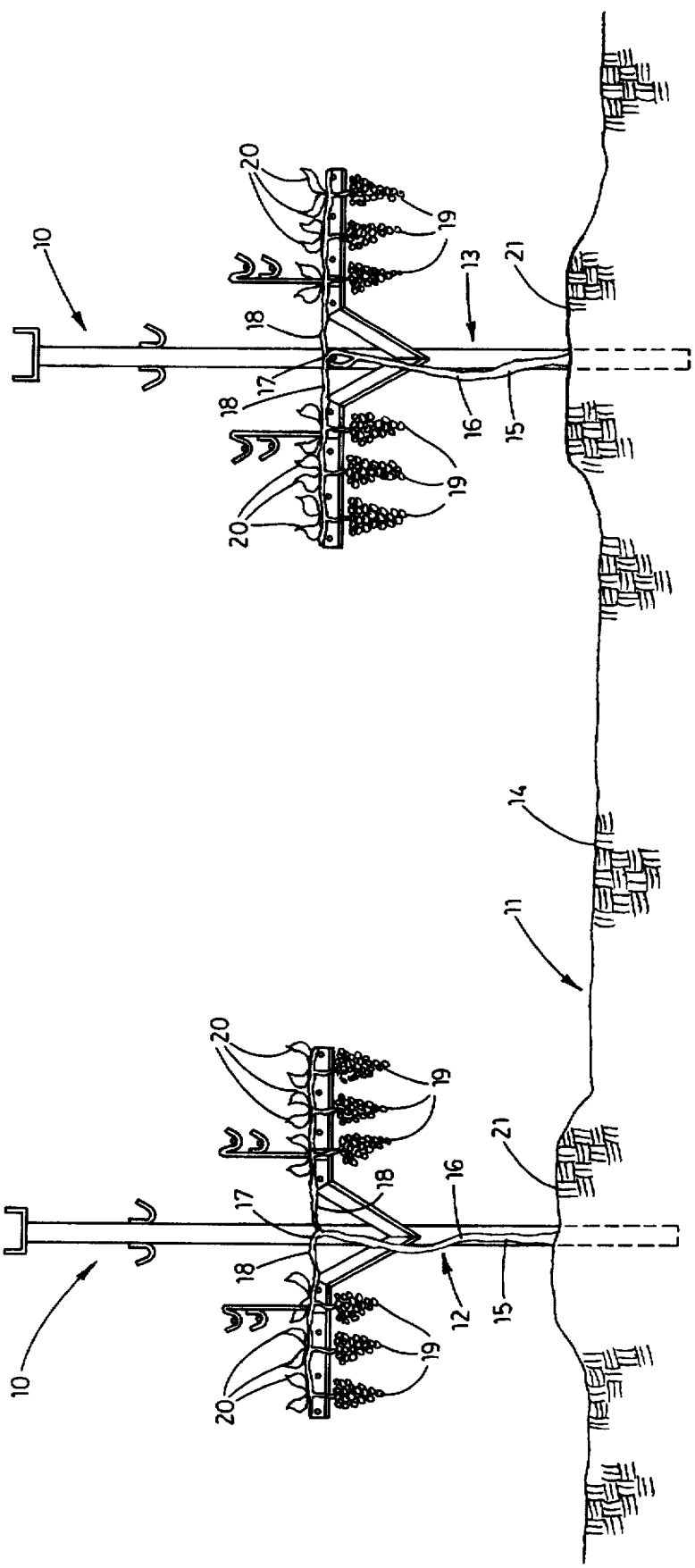
FIG. 2 is a somewhat enlarged, transverse vertical section taken from the position indicated by line 2—2 in FIG. 1 and additionally showing a second row of grapevines within which a second apparatus of the present invention has been installed.

Referring more particularly to the drawings, the apparatus for plant culture of the present invention is generally indicated by the numeral 10 in FIG. 1. As shown in FIGS. 1 and 2, the earth's surface is indicated at 11. As will subsequently become more clearly apparent, the method and apparatus of the present invention have application to a wide variety of plants. For illustrative convenience, however, they are shown and described herein in regard to grapevines. Thus, referring more particularly to FIG. 2, a first row of grapevines is indicated at 12 on the left therein and a second row of grapevines is indicated at 13 on the right. The rows of grapevines are separated by a path 14 along which vehicles and field workers would normally pass in caring for the grapevines. It will be understood that the rows of grapevines 12 and 13 constitute a portion of a vineyard consisting of a multiplicity of similar substantially parallel rows of grapevines.

Each row of grapevines 12 and 13 is comprised of a plurality of plants, or grapevines 15, planted in the earth in predetermined spaced relation. Each grapevine has a trunk 16 which, as will be described, is supported by the apparatus 10. Each grapevine is trained to have a cordon 17 at the upper end thereof extending laterally of the trunk and from which flexible portions, or canes, 18 grow. It is the canes which produce the crop, in this case bunches of grapes 19, and foliage 20. Each grapevine is planted, in the conventional fashion, in a berm 21 which is simply a mounded portion of earth within which and along which the grapevines are planted.

It will be understood that the planting of the grapevines 15 in substantially parallel rows, the training of grapevines in supported relation on stakes and the normal horticultural growth pattern heretofore described of grapevines is, of course, entirely conventional. However, the method and apparatus of the present invention hereinafter described, is novel. As previously described, the method and apparatus of the present invention, while having particular utility in the training and care of grapevines, have application to a wide variety of types of plants.

For purposes of illustrative convenience, only one grapevine 15 is shown in FIG. 1. It is to be understood, however, that the grapevines are planted and trained in a manner consistent with the method and apparatus of the present invention hereinafter to be described.

The apparatus 10 has a frame or trellis structure 30 which extends the entire length of each row of grapevines and, in the preferred embodiment, is comprised of sub-assemblies which are preferably repeated in sections 31 of the apparatus. The portion of the apparatus 10 shown fragmentarily in FIG. 1 is one such section 31 which, in a single row, may possess ten or more such sections extending continuously throughout the length of the row. The number of sections employed is dependent substantially only on the length of the row.

As shown in FIG. 1, an end of the trellis structure 30 is indicated at 32. The trellis structure at this point has a high tension support structure 33 including a T-frame 34. The T-frame has an upright member 35, which is preferably a steel pipe, mounted in the berm 21 within a concrete foundation 36. The upright member is preferably canted, as shown in FIG. 1, at an angle to true vertical so that it extends upwardly and toward the left, as viewed in FIG. 1. A cross member 37, also preferably a steel pipe, is mounted, as by welding, on the upright member 35 in a substantially horizontal attitude substantially normal to the upright member and to the row. A piling 38 is mounted in the berm 21, using concrete if desired, endwardly of the end trellis structure 32. A high tension retention wire 39 interconnects the piling 38 and the cross member 37 to assist in retaining the T-frame 34 in the attitude described.

There is, of course, a second high tension support structure 33 at the opposite end of the row mounted in the earth in the manner heretofore described, but with the T-frame 34 thereof mounted so as to be canted in the opposite direction for the same purpose.

A mast structure 45 is mounted on the cross member 37 of each of the T-frames 34 at the opposite ends of each row. Each mast structure is disposed at right angles to its respective cross member 37, centrally thereof, and extends upwardly in vertical relation. Each mast structure extends to an upper end portion 46. A high tension retention wire 47 interconnects each piling 38 with the upper end portion 46 of its adjacent mast structure.

The trellis structure 30 includes a multiplicity of upright members or stakes 48 mounted in the berm 21 in predetermined spaced relation to each other extending throughout the length of the row. The stakes can be constructed of wood or metal and have individual upper ends 49 which are aligned longitudinally of the row at the same elevation. A high tension central wire 50 is mounted on and interconnects the cross members 37 of the T-frames 34 at the opposite ends of the row extending therebetween and across the upper ends 49 of the stakes 48. The upper ends 49 of the stakes are preferably individually connected to the central wire 50 by any suitable means, such as a staple or bracket not shown. It will be understood that the trellis structure, including the high tension support structures 33 and the central wire 50 comprise a structure not dependent upon the stakes 48 for support, but operating entirely independently thereof. Thus, if a stake 48 is broken or otherwise damaged, it can be removed and replaced without in any way compromising the strength of the trellis structure 30.

Each section 31 of the trellis structure 30 of each row of grapevines has a securing structure 55. Securing structure has an upright member 56, preferably constructed of steel and of right-angular cross-section. The upright member has a lower portion 57 mounted in the berm 21, preferably in concrete, in alignment with the stakes 48 of the row and disposed in vertical relation. Each securing structure has an upper portion 58 at substantially the same height as the upper end portions 46 of the mast structures 45 and aligned therewith to define an axis extending longitudinally of its respective row of grapevines.

Figure 3A:
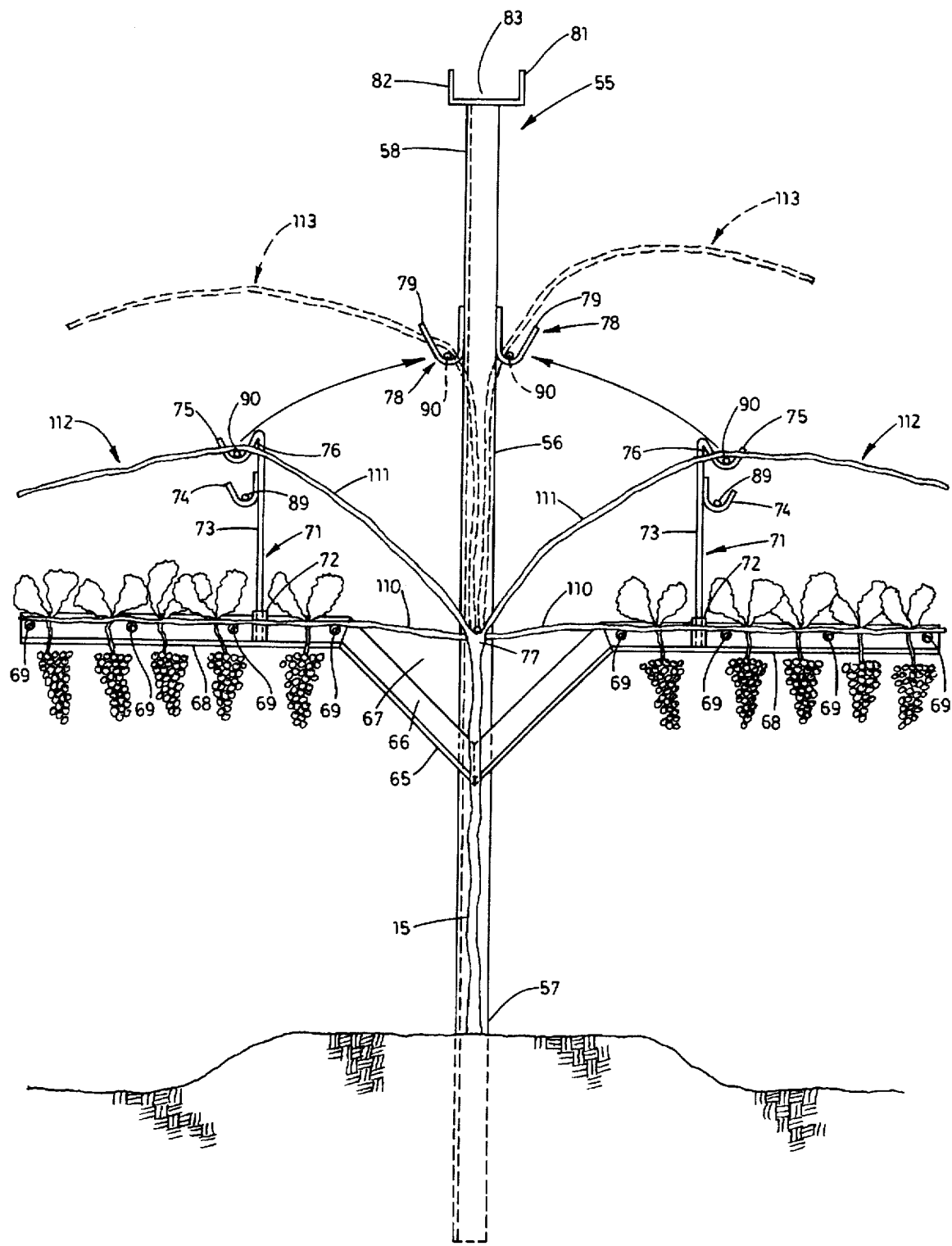
FIG. 3A is a somewhat further enlarged, transverse vertical section taken on line 3—3 in FIG. 1 showing the fruiting and renewal canes of the grapevine in full lines in their respective first positions and the renewal canes in phantom lines in second positions.

Each securing structure 55 has a cross member assembly 65 mounted on and extending transversely thereof between the lower portion 57 and the upper portion 58, as shown in the drawings. Each cross member assembly includes a central V-frame 66 defining an upwardly facing channel 67 and extending laterally in opposite directions with horizontal members 68. The horizontal members are pierced by a plurality of wire holes 69 disposed in spaced relation and defining a horizontal plane, as best shown in FIG. 3A. Similarly, a wire hole 69 extends through the upright member 56 disposed at an elevation slightly above the plane defined by the remainder of the wire holes 69.

A pair of first wire support assemblies 71 are individually mounted on the horizontal members 68 of the cross member assembly 65 of each securing structure 55. Each first wire support assembly includes a sleeve 72 mounted, as by welding, on each of the horizontal members 68 and facing upwardly to define a vertical axis. The sleeves 72 are spaced equal distances on opposite sides of the upright member 56. A support 73 is mounted in each of the sleeves 72 in upstanding relation. Each of the supports has a lower support hook 74 mounted thereon in spaced relation to the horizontal member 68 and oriented as shown in the drawings so that the concave surface thereof is disposed in substantially upwardly facing relation. Each of the supports 73 mounts an upper support hook 75 disposed in vertical alignment with its respective lower support hook 74, in spaced relation thereto and with the concave surface thereof disposed in substantially upwardly facing relation. At the juncture of each upper support hook 75 and its respective support 73, a notch 76 is provided which faces, in essence, in a downward direction and toward the concave upwardly facing surface of its respective lower support hook 74.

Second wire support assemblies 78 are mounted, as by welding, on opposite sides of the upright member 56 in alignment extending transversely of the row of grapevines in opposite directions. Each second wire support assembly has a support hook 79 mounted, as by welding, on the upright member 56 and having the concave surface thereof disposed in an upwardly facing relation.

A third wire support assembly 81 is mounted on the upper portion 58 of the upright member 56. A third wire support assembly includes a channel member 82 mounted, as by welding, on the upper portion 58 with the channel 83 thereof disposed in an upwardly facing relation. The first, second and third wire support assemblies 71, 78 and 81 respectively are disposed in spaced relation to each other as best shown in FIGS. 3A through 3D.

The apparatus 10 has a pair of control wire assemblies generally indicated by the numerals 85 in FIG. 1. Each control wire assembly includes a mounting sleeve 86, mounted, as by welding, on the cross member 37 of the T-frame 34 in substantially equidistant, spaced relation to the mast structure 45 at each end of the row of grapevines. Each of the mounting sleeves has an upright member 87 slidably received therein in upstanding relation. Each upright member 87 has a pair of wire slots 88 extending horizontally inwardly thereof from the left surfaces thereof, as shown in FIG. 1, and disposed in predetermined vertically spaced relation to each other. Thus, it will be seen that a pair of upright members 87 individually extend upwardly from the right portions of the cross members 37 in each end of the row of grapevines in alignment with each other defining a vertical plane extending in parallel relation to the upright mast structures 45 thereof. Similarly, corresponding upright members 87 are individually mounted on the left end portions of the cross members 37 at opposite ends of the row of grapevines and define a vertical plane parallel to the mast structures 45 at the opposite ends of the row of grapevines.

Lower control wires 89 are individually, slidably received in the corresponding lower pair of wire slots 88 of the respective upright members. Similarly, upper control wires 90 are individually slidably received in the corresponding respective upper wire slots 88 of the corresponding upright members 87. Thus, it will be seen that vertically aligned and parallel upper and lower control wires 89 and 90 extend the full length of the row of grapevines on each side of the mast structures 45, as best shown in FIG. 1. Preferably, the lower and upper control wires have loops or knots formed in the opposite ends thereof which are of greater cross sectional area than the vertical dimensions of their respective wire slots. Using wire tensioners, not shown, the upper and lower control wires are placed under high tension, slidably received in their respective slots and retained in position by engagement with their respective knots or loops at the opposite ends thereof with the endward surfaces of their respective upright members. Thus, when desired in accordance with the method of the present invention, using a wire tensioner, the loop or knot at either or both ends of the upper or lower control wire can be drawn away from the endward surface of the upright member against tension of the control wire so that the control wire can be slidably removed from its respective wire slot for purposes hereinafter described.

The trellis structure 30 includes a multiplicity of trellis wires 95 mounted on the cross members 37 of the T-frames 34 and extending between the supporting structures 33 at the opposite ends of the row. The trellis wires 95 are under high tension and individually extend through the wire holes 69 of the horizontal members 68 of each cross member assembly 65 of each securing structure.

A pair of metal plates 100 are individually mounted, as by welding, on each mast structure 45 in vertically spaced relation to each other, as best shown in FIG. 1. Each plate 100 has a pair of upwardly facing slots 101 laterally disposed relative to its respective mast structure and on opposite sides thereof. Each lower plate 100 is at the same elevation as the second wire support assemblies. Each upper plate 100 is at the same elevation as the third wire support assemblies 81.

Referring more particularly to FIGS. 3A through 3D, for illustrative convenience, grapevines 15 are shown with the flexible portions, or canes, 18 thereof shown in various positions in accordance with the practice of the method of the present invention hereinafter described. In accordance with the present invention, a distinction is made between the fruiting canes, generally indicated by the numerals. 110 throughout the several views, and renewal canes, generally indicated by the numerals 111. More specifically, the fruiting canes are those canes of a grapevine which produce the crop, or bunches of grapes 19, during the growing season. The renewal canes are those canes produced by the grapevine which are permitted to grow during a given growing season, but which do not produce a crop in their first season of growth. Subsequently, in the next growing season the renewal canes do produce a crop and thereby become the fruiting canes of that next growing season. In some cases herein, the renewal canes 111 are referred to as "the first canes" and the fruiting canes 110 as "the second canes."

Figure 3B:
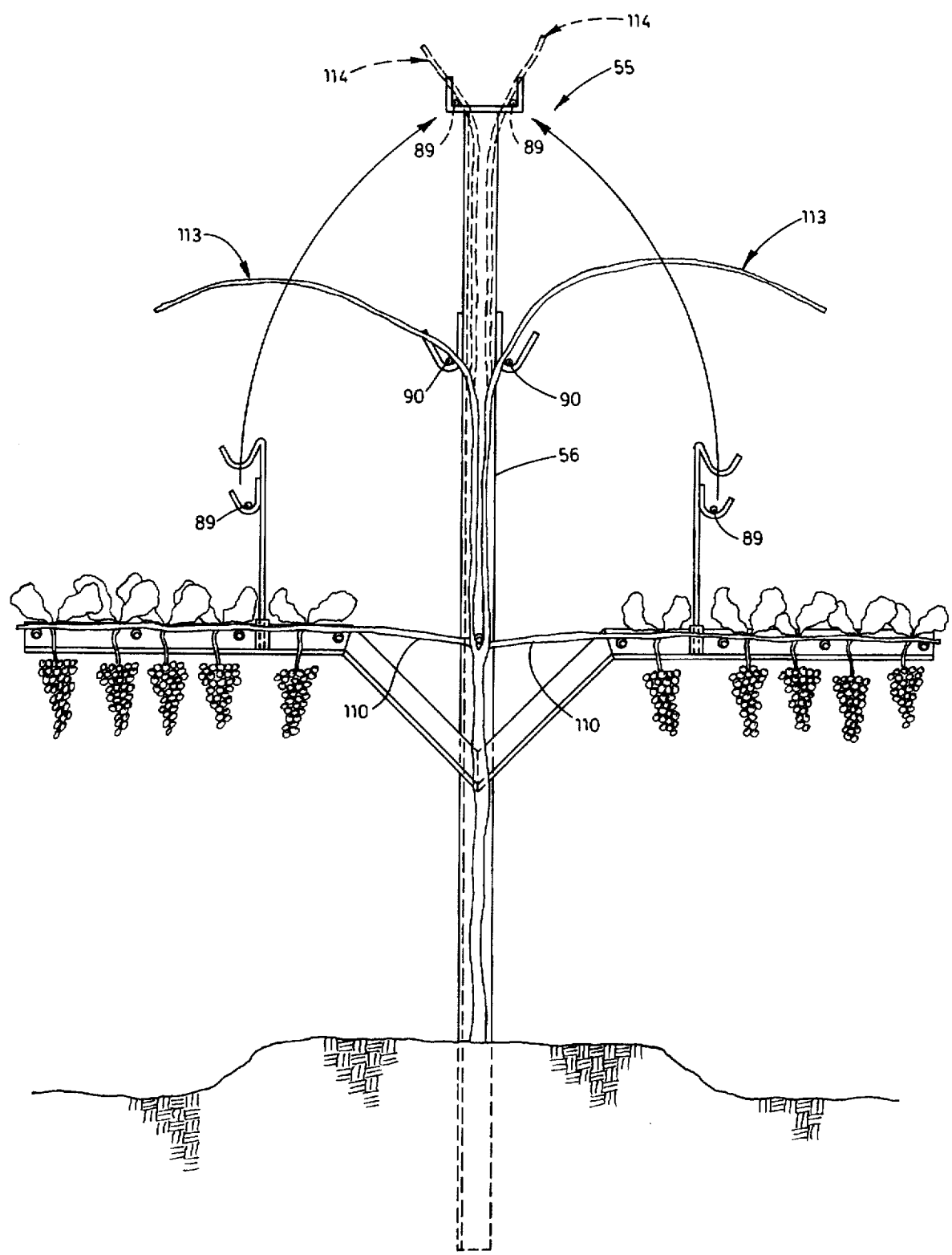
FIG. 3B is a somewhat enlarged, transverse vertical section taken on line 3—3 in FIG. 1 showing the fruiting canes of the grapevine in full lines in first positions, the renewal canes in full lines in the second positions and the renewal canes in phantom lines in third positions.
Figure 3C:
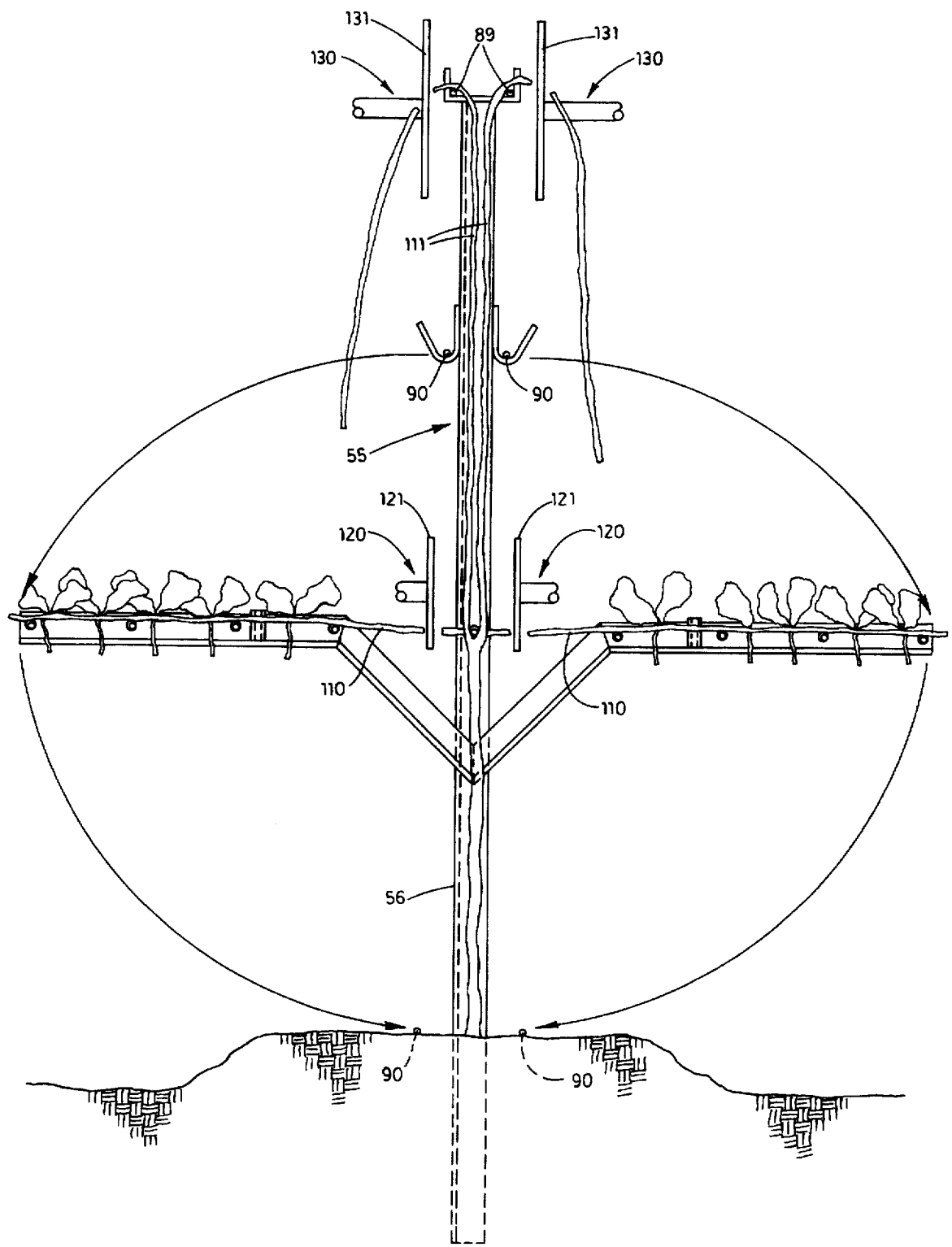
FIG. 3C is a somewhat enlarged, transverse vertical section taken on line 3—3 in FIG. 1 showing the fruiting canes of the grapevine in full lines in the first positions and the renewal canes in full lines in the third positions, depicting pruning thereof in accordance with the subject invention and movement of certain of the control wires thereof.
Figure 3D:
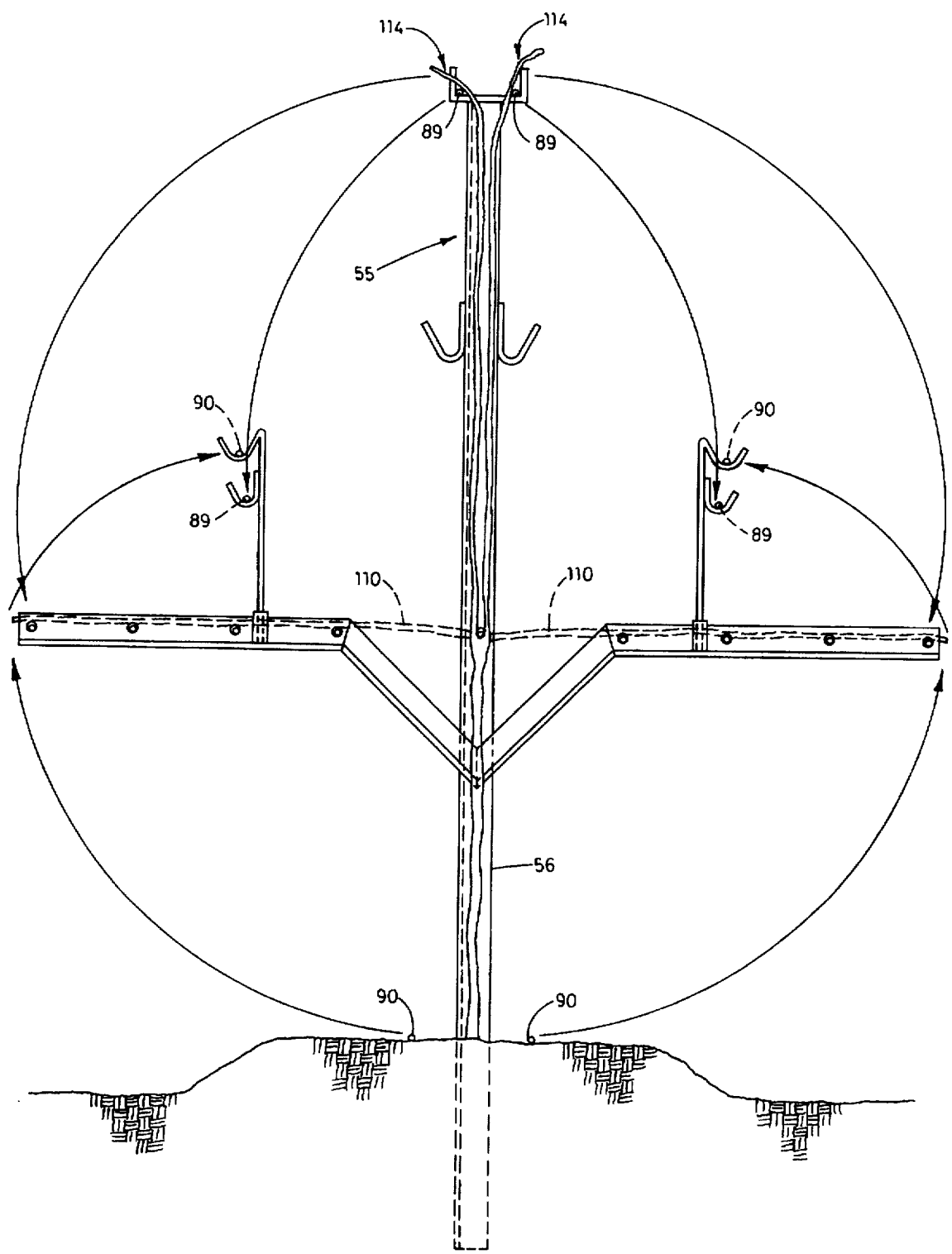
FIG. 3D is a somewhat enlarged, transverse vertical section taken on line 3—3 in FIG. 1 showing fruiting canes of the grapevine in phantom lines in first positions, the renewal canes in full lines in the third positions and depicting movement of certain of the control wires.

Referring more particularly to FIG. 3A, first positions for the renewal canes 111 are generally indicated by the numerals 112 and shown in full lines in FIG. 3A. Referring more particularly to FIGS. 3A and 3B, second positions of the renewal canes are generally indicated by the numerals 113. The second positions of the renewal canes 113 are shown in phantom lines in FIG. 3A and in full lines in FIG. 3B. Referring more particularly to FIGS. 3C and 3D, third positions for the renewal canes are generally indicated by the numerals 114, as shown in full lines therein.

In accordance with the practice of the method of the present invention hereinafter described, saws 120, having blades 121, are employed to sever the fruiting canes as shown in FIG. 3C and as will hereinafter be described in greater detail. Similarly, and as also shown in FIG. 3C, mechanical sickles 130, having sickle blades 131, are employed to sever the renewal canes 111, as hereinafter described in greater detail. The saws and mechanical sickles are borne by any suitable apparatus, not shown.

OPERATION

The operation of the described embodiment of the present invention and the practice of the method hereof is believed to be readily apparent and is briefly summarized at this point.

The apparatus 10 is mounted in the earth as heretofore described, thereby forming the trellis structure 30 on which the grapevines on which the grapevines 15 are supported and trained. While the grapevines can be trained on the trellis structure in a variety of different ways, for purposes of illustrative convenience, it will be understood as described herein that a grapevine is planted on each side of each stake 48 within their respective row. The trunk 16 of each grapevine is extended upwardly along the respective face of its respective stake, using suitable ties if necessary. The cordon 17 of each grapevine is then trained along the central wire 50 in a direction away from its respective stake. The cordons of the grapevines of adjacent stakes thus reach toward each other.

The canes 18 of a grapevine 15 grow from the cordon 17 in random fashion and it is the canes that produce the crop, or bunches of grapes 19, as well as the foliage 20. However, it is known that the canes produced in a single growing season do not produce a crop typically until the next growing season. Therefore, the canes produced in one year must be left in place until the next season for a crop to be produced. Conversely, the canes which have once produced a crop should be removed by pruning to make room for the growing canes in the next growing season. Thus, when such pruning takes place, the field workers must, in accordance with conventional plant culture, be extremely careful to prune away only the canes which have already produced a crop. In conventional horticultural practices, the canes are randomly positioned on the conventional trellis structure so that the distinction between the canes to be pruned away and the canes to be left in position is obscure. The method and apparatus of the present invention completely obviate this difficulty as well as possessing numerous other benefits.

Assuming, for purposes of illustrative convenience, that the description hereinafter to follow is to be with grapevines not having any canes 18 trained on the trellis structure 30, the lower and upper control wires 89 and 90 respectively on opposite sides of the row of grapevines are individually positioned in the first wire support assembly 71, as shown in FIG. 3A. More specifically, the lower control wires 89 are individually received in the respective lower support hooks 74 of the securing structures 55 of the row of grapevines. The upper control wires 90 are individually positioned in the upper support hooks 75 of the securing structures 55 of the row of grapevines. Thus, both upper and lower control wires are retained in spaced relation above the horizontal members 68 of the cross member assembly 65 of each securing structure, as shown in FIG. 3A. The fruiting canes 110 are trained and grown in opposite directions onto the trellis wires 95 of the horizontal member 68 in opposite directions as shown in FIGS. 2, 3A, and 3B.

In accordance with the method of the present invention, the renewal canes 111 are permitted to grow upwardly from the cordon 17 of each grapevine which is in accordance with their natural growing pattern. The renewal canes are allowed to continue to grow upwardly and, as such growth continues, the weight of the renewal canes causes them to bend outwardly in opposite directions. As such growth is allowed to continue, the renewal canes ultimately drape over and continue to grow laterally beyond the upper control wires 90 on opposite sides of the mast structures 55, as shown in FIG. 3A.

Referring more particularly to FIG. 3B, in accordance with the method of the present invention, when the growth of the renewal canes 111 reaches the condition substantially as shown in FIGS. 3A and 3B, the renewal canes are elevated in stages. More specifically, the upper control wires 90 are removed from their respective upper support hooks 75 by any suitable means, such as a hook or other mechanical device, and lifted into and supported on the support hooks 79 of the second wire support assembly 78 as shown in phantom lines in FIG. 3A and in full lines in FIG. 3B. This is done on all of the securing structures 55 of each row so that the renewal canes are elevated to the position shown in FIG. 3B between adjacent securing structures throughout the entire length of the row. At the same time, using a suitable wire tensioning mechanism, not shown, the looped or knotted end portions of the upper control wires are pulled endwardly from the respective upright members 87 to permit the upper control wires to be slidably removed from their respective wire slots 88. The upper control wires are thereafter individually positioned in the slots 101 of the lower plate 100 of each mast structure 45 at each end of the row so that the renewal canes of the grapevines near the mast structures 45 are also retained in the elevated second positions 113 shown in FIG. 3B. The lateral weight of the outer portions of the renewal canes insures that the renewal canes continue to extend over the upper control wires as shown therein.

During this period of time, the fruiting canes 110 are retained in the position shown in the several views and grow the bunches of grapes 19 extending gravitationally beneath the trellis wire 95 on opposite sides of the row of grapevines, as shown in the drawings.

As growth of the grapevines 15 continues during the growing season, the renewal canes 111 continue to grow outwardly over the upper control wires 90 laterally on opposite sides of the grapevines as shown in FIG. 3B. In accordance with the method of the present invention, when the renewal canes grow to the lengths as generally shown in FIG. 3B, the lower control wires 89 are removed from their respective lower support hooks 74 and are moved upwardly along the courses indicated by the arrows in FIG. 3B and individually positioned in the channel 83 of the third wire support assembly 81. In so moving the lower control wires, the outer portions of the renewal canes are carried upwardly to the positions shown in phantom lines in FIG. 3B constituting the third positions of the renewal canes 114. The renewal canes are thus retained in positions extending upwardly to the full height of the securing structures 55 and in corresponding positions between adjacent securing structures. In the meantime, the bunches of grapes 19 continue to grow and mature suspended beneath the trellis wires 95 as shown in the drawings.

As previously described relative to the upper control wires 90, simultaneously with the movement of the lower control wires 89 to raise the renewal canes to the third positions, the opposite ends of the lower control wires are pulled endwardly by suitable wire tensioning apparatus, to permit movement of the lower control wires from their respective wire slots 88. The opposite ends of the lower control wires are then moved to the upper plate 100 and individually inserted in the slots 101 thereof. Release of the opposite ends of the lower control wires in the described position causes the loops or knots to engage the plates and thereby retain the lower control wires in the upper positions so that the renewal canes adjacent to the mast structures 45 at the opposite ends of row are also retained in the third positions 114 shown in FIG. 3B.

Referring again briefly to FIG. 3A, when the upper control wires 90 are moved from the first positions 112 shown in FIG. 3A, the foliage grown by the renewal canes 111 may become entwined in the lower control wires 89 immediately therebeneath. When the upper control wires are moved from their respective upper support hooks 75 to move the renewal canes to the second positions 113, as shown in phantom lines in FIG. 3A, the lower control wires 89, or some portions thereof may be pulled upwardly by the foliage of the renewal canes thereabove entwined thereabout. Where this occurs, the lower control wires 89 are drawn into the notches 76 immediately thereabove preventing further upward movement of the lower control wires. As a consequence, the foliage of the renewal canes is pulled free from the lower control wires captured in the notches 76 so that movement of the renewal canes to the second positions 113 is permitted to continue. When the foliage is pulled free from the lower control wires, the lower control wires are pulled by gravity and by the high tension of the lower control wires back into the lower support hooks 74 as shown in FIG. 3A.

At this time the supports 73 are slidably removed from their respective sleeves 72 to make room for the operations to follow.

Growth of the grapevines 15 is allowed to continue until such time as production of the crop requires further attention. Where the bunches of grapes 19 are grown for harvesting as fresh grapes, such further attention can be by either manual or mechanized harvesting of any desired type. This can be performed by any conventional, or other, means with the grapevines trained as shown in FIG. 3B with the renewal canes in the third positions 114.

However, the method and apparatus of the present invention are uniquely well suited to the drying of the grapes on the grapevines for the production of raisins. Where the bunches of grapes are grown for this purpose, the next step in the practice of the method and apparatus of the present invention is depicted in FIG. 3C. For illustrative convenience, the bunches of grapes are not shown on the vines in FIG. 3C, although they would be present at the time the steps hereinafter described are performed. Conventional practice calls for such on the vine drying of the grapes to form raisins to involve severing of the fruiting canes so that no further fluid is passed through the canes to the bunches of grapes. However, in accordance with the method and apparatus of the present invention, with the fruiting canes extended laterally of the grapevines 15 as shown in the drawings, such severing is performed with the method and apparatus of the present invention by transporting saws 120 along the row of grapevines with the blades 121 operational in the positions shown in FIG. 3C to sever the fruiting canes adjacent to the cordon 17 of the grapevines and passing the entire length of the row of grapevines so as to sever all of the fruiting canes in this manner. The upwardly facing channel 67 of the central V-frame 66 of the cross member assembly 65 allows room for the saw blades to pass in this fashion as depicted in FIG. 3C.

Subsequently, the bunches of grapes are allowed to dry on the grapevines to form the raisins and are thereafter harvested by any desired means including manual or mechanical harvesting. It will be seen that such harvesting is facilitated in view of the fact that the bunches of grapes, now raisins, are suspended in substantially the same plane and therefore are readily accessible to mechanical or manual harvesting. It will also be seen that since the foliage 20 of the grapevines is isolated from the bunches of grapes, exposure to the sun from sun drying is greatly enhanced.

Subsequently, the fruiting canes 110 are simply pulled in opposite directions off of the trellis wires 95 for disposal in accordance with conventional practice by shredding or the like. This leaves the trellis wires 95 free of any canes or other plant material. The upper control wires 90 are now individually removed from the support hooks 79 of the second wire support assembly 78 and moved downwardly in the directions indicated by the arrows in FIG. 3C to positions rested on the berm 21 on opposite sides of the trunk 16 of the grapevines 15. Thereafter, the mechanical sickles 130 borne by a suitable apparatus are drawn along the row of grapevines so that the sickle blades 131 cut the outer end portions of the renewal canes 111, as depicted in FIG. 3C. These outer end portions are also disposed of in accordance with conventional practice. The supports 73 are then individually reinserted into their respective sleeves 72, as shown in FIG. 3D.

Referring more particularly to FIG. 3D, the lower control wires 89 are then removed from the channel 83 of the third wire support assembly 81 and returned to rested positions on the lower support hook 74 of the respective first wire support assemblies 71 along the courses indicated by the arrows in FIG. 3D. This movement frees the renewal canes 111 from the third positions 114 shown in full lines in FIG. 3D. The renewal canes are thus permitted to fall in opposite directions and are assisted manually to move to the position shown in phantom lines in FIG. 3D laid in opposite directions laterally over the trellis wires 95. Thus, the renewal canes 111 have become the fruiting canes 110 for the next growing season. Subsequently, the upper control wires 90 are moved from their positions rested on the berm 21 in the direction of the arrows to positions again rested in the first support hooks 75 of the first wire support assembly 71 on opposite sides of the securing structures 55. Similarly, the opposite ends of the respective upper and lower control wires are removed from the slots 101 of the plates 100 of the mast structures 45 and returned to the respective wire slots 88 of the upright members 87 as shown in FIG. 1.

Thus, the apparatus 10 of the present invention is again returned to a condition for the next growing season wherein the previous year's renewal canes 111 have become the next year's fruiting canes 110 and are disposed in the position shown in phantom lines in FIG. 3D. In the next growing season, new renewal canes 111 will begin to grow from the cordons 17 of the grapevines upwardly and outwardly as depicted in FIG. 3A to begin the cycle all over again.

Therefore, the method and apparatus for plant culture of the present invention provide an extremely efficient and dependable means by which crops can be grown for mechanized treatment and handling with minimal manual labor, with little or no training of field workers, to produce a superior crop of maximum volume and in such a fashion as to lend itself to full mechanized farming of such plants, and having particular utility in application to the commercial farming of grapevines.

Although the invention has been herein shown and described in what is conceived to be the most practical and preferred embodiment(s), it is recognized that departures may be made therefrom within the scope of the invention which is not to be limited to the illustrative details disclosed.

Having described our invention, what we claim as new and desire to secure by Letters Patent is:

1. A method for growing grapevines and the like, which grow canes which do not produce a crop in a first growing season and which do produce a crop in a succeeding second growing season, the method comprising the steps of:

A. growing the grapevines in individually supported, substantially upright relation on a structure with the individual grapevines thereof disposed substantially in a row and spaced from each other in said row;

B. permitting said canes to grow from the grapevines in a given growing season;

C. segregating the canes into first canes which do not produce a crop in said given growing season and second canes which do produce a crop in said given growing season;

D. placing said second canes in areas laterally disposed with respect to said grapevines for the production of said crop; and E. constraining said first canes as they grow in upstanding attitudes vertically spaced from said second canes and wherein said first canes in said constraining step are elevated in stages as they grow through at least one intermediate stage to a final elevated stage in which said first canes are held in substantially vertical attitudes.

2. A method for growing grapevines and the like, which grow canes which do not produce a crop in a first growing season and which do produce a crop in a succeeding second growing season, the method comprising the steps of:

A. growing the grapevines in individually supported, substantially upright relation on a structure with the individual grapevines thereof disposed substantially in a row and spaced from each other in said row;

B. permitting said canes to grow from the grapevines in a given growing season;

C. segregating the canes into first canes which do not produce a crop in said given growing season and second canes which do produce a crop in said given growing season;

D. placing said second canes in areas laterally disposed with respect to said grapevines for the production of said crop; and E. constraining said first canes as they grow in upstanding attitudes vertically spaced from said second canes and elevated to individual, substantially vertical attitudes and wherein said first canes in said constraining step are elevated in stages as they grow through a pair of intermediate stages to a final elevated stage in which said first canes are held in substantially vertical attitudes.

3. The method of claim 2 including the step of:

F. harvesting the crop from said second canes in said given growing season.

4. The method of claim 3 including the steps of:

G. removing said second canes from the grapevines after said harvesting step; and H. after said removing step, moving said first canes into said areas laterally disposed with respect to said grapevines for the production of a crop in a next successive growing season.

5. The method of claim 4 wherein prior to said harvesting step said second canes are severed after said grapes have grown and sufficiently before said harvesting step to achieve dehydration of the grapes to form raisins harvested in said harvesting step.

6. The method of claim 4 wherein prior to said moving step said first canes are trimmed to a predetermined length prior to being moved in said moving step.

* * * * *

UNITED STATES PATENT AND TRADEMARK OFFICE
CERTIFICATE OF CORRECTION

PATENT NO. : 5,638,636
DATED : June 17, 1997
INVENTOR(S) : KAZUO HIYAMA; HOWARD K. HIYAMA; DEAN H. HIYAMA It is certified that error appears in the above-identified patent and that said Letters Patent is hereby corrected as shown below:

Column 7, line 38, delete the period after "numerals"

Signed and Sealed this

Ninth Day of September, 1997

Attest:

BRUCE LEHMAN

*Attesting Officer*    *Commissioner of Patents and Trademarks*